No. 773,812. PATENTED NOV. 1, 1904.
C. W. RUSSELL.
CONTROLLING DEVICE FOR MOTOR VEHICLES, &c.
APPLICATION FILED MAY 11, 1903.
NO MODEL. 2 SHEETS—SHEET 1.
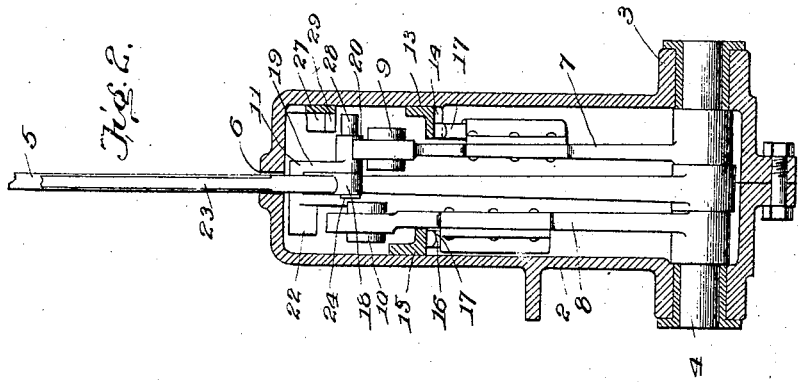
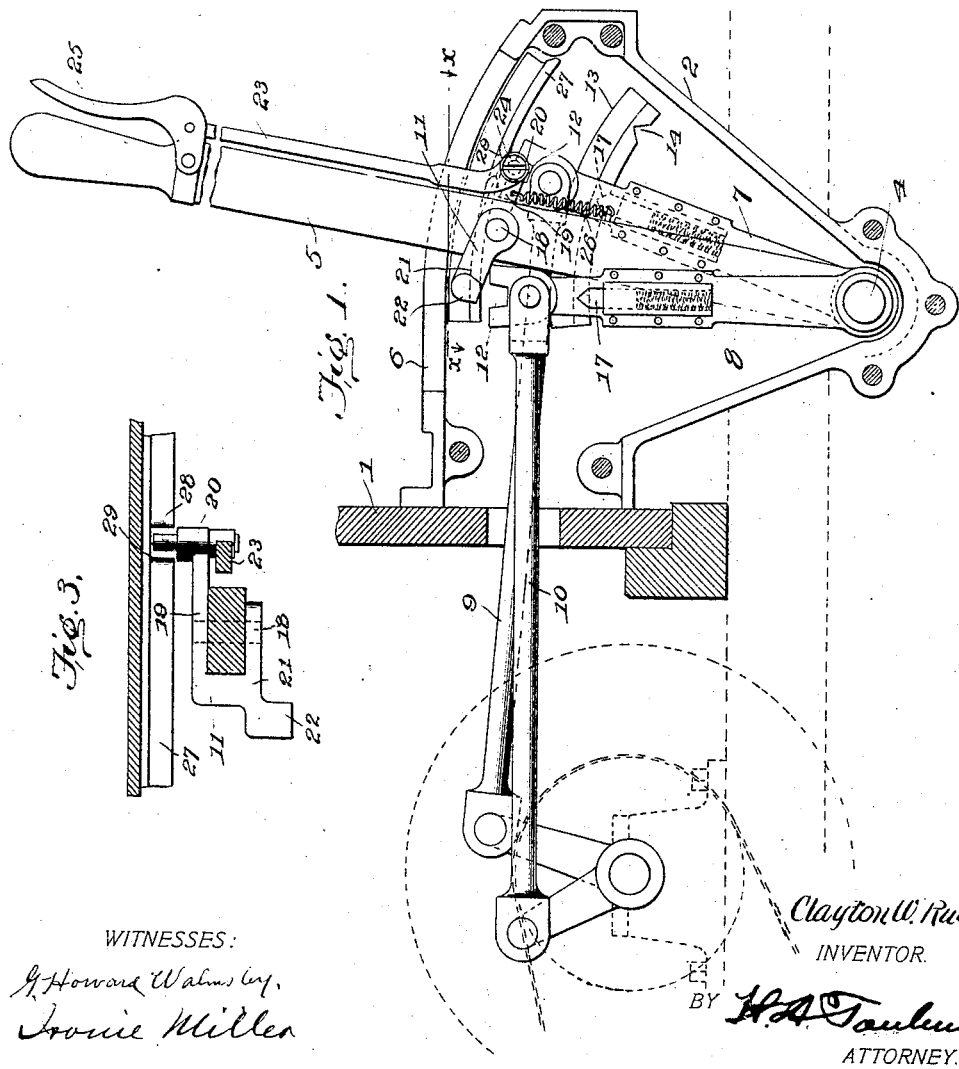
WITNESSES:
Clayton W. Russell,
INVENTOR.
BY
ATTORNEY.

No. 773,812. PATENTED NOV. 1, 1904.
C. W. RUSSELL.
CONTROLLING DEVICE FOR MOTOR VEHICLES, &c.
APPLICATION FILED MAY 11, 1903.
NO MODEL. 2 SHEETS—SHEET 2.
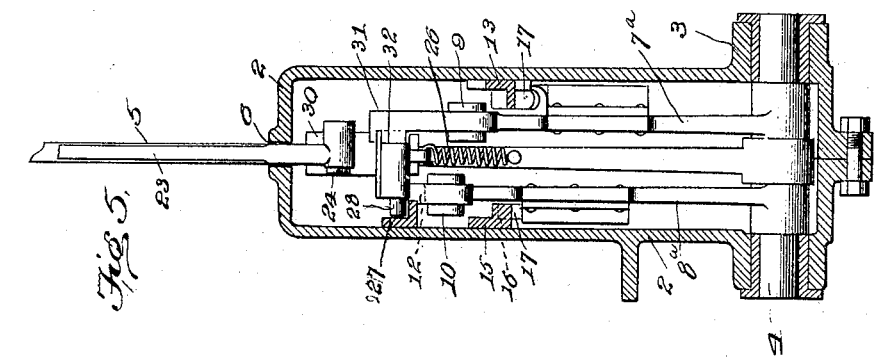
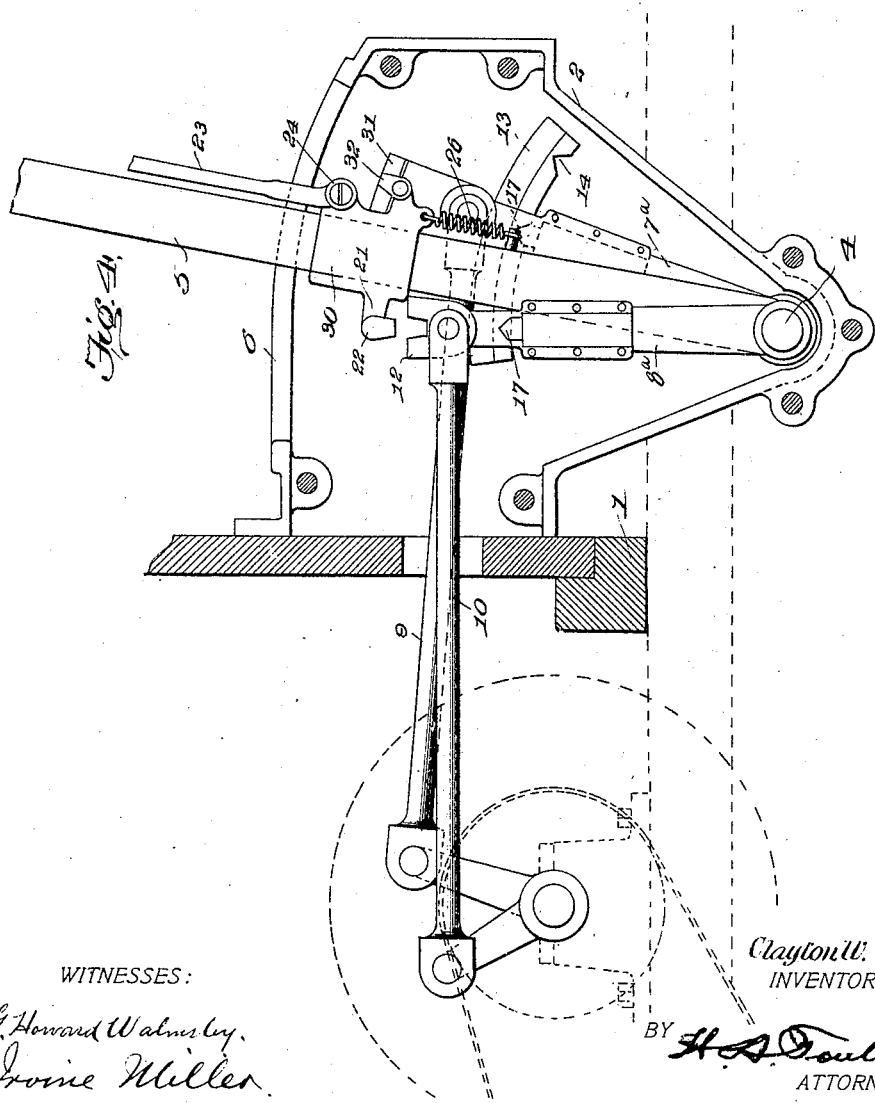
WITNESSES:
G. Howard Walmsley.
Irvine Miller.
Clayton W. Russell,
INVENTOR.
BY H. A. Toulmin
ATTORNEY.

No. 773,812.  
Patented November 1, 1904.

UNITED STATES PATENT OFFICE.

CLAYTON W. RUSSELL, OF SPRINGFIELD, OHIO.

CONTROLLING DEVICE FOR MOTOR-VEHICLES, &c.

SPECIFICATION forming part of Letters Patent No. 773,812, dated November 1, 1904.

Application filed May 11, 1903. Serial No. 156,604. (No model.)

*To all whom it may concern:*

Be it known that I, CLAYTON W. RUSSELL, a citizen of the United States, residing at Springfield, in the county of Clark and State of Ohio, have invented certain new and useful Improvements in Controlling Devices for Motor-Vehicles, &c., of which the following is a specification, reference being had therein to the accompanying drawings.

This invention relates to controlling devices for motor-vehicles, and has for its object to provide means whereby a single controlling-lever may be made to control various devices—such, for instance, as those which regulate the speed and direction of the vehicle.

To these ends my invention consists in certain novel features which I will now proceed to describe and will then particularly point out in the claims.

In the accompanying drawings, Figure 1 is a side elevation, partly in section, of a structure embodying my invention in one form. Fig. 2 is a front elevation of the same, partly in section. Fig. 3 is a detail plan section taken on the line $x\,x$ of Fig. 1. Fig. 4 is a view similar to Fig. 1, illustrating another form of my invention; and Fig. 5 is a view of the same similar to Fig. 2.

Referring first to the construction shown in Figs. 1, 2, and 3, 1 indicates the body of the vehicle, and 2 a suitable casing secured thereto and having bearings 3 for the shaft 4. On this shaft is mounted the controlling-lever 5, which extends up through a slot 6 in the casing 2 to a point within convenient reach of the operator. On this shaft 4 are mounted so as to move independent around the same two arms 7 and 8, located one on each side of the lever 5. One of these arms—as, for instance, the arm 7—may be connected by means of a rod 9 or otherwise to a speed-controlling gear of any suitable construction, so that movement of said arm forward or backward from its normal or inoperative position, which is that shown, will give a fast or slow speed to the vehicle, while the outer arm 8 may be connected by a rod 10 or otherwise to devices which reverse the direction of the motor or operate a brake, or both, so that motion of said arm 8 from its normal or inoperative position, which is that shown, may, if in one direction, reverse the direction of the travel of the vehicle and in the other direction apply a brake. These connections may, however, be varied as desired. Each arm is adapted for engagement by a dog 11, carried by the lever 5, and preferably this is effected by providing each arm with a notch or recess 12 in its upper end. Each arm is also provided with detent devices for holding it in the position to which it may be moved by the controlling-lever. To this end the casing 2 is provided on one side with a projecting flange or ledge 13, having therein notches 14, three of which are shown in the present instance, said flange being located adjacent to the arm 7, while on the other side, adjacent to the arm 8, is a similar flange or ledge 15, having similar notches 16. Each arm is provided with a spring-pressed detent-finger 17, having a double beveled end adapted to engage the corresponding notches, but free to yield to disengage the arm when sufficient power is applied to the lever 5.

The dog 11 is movable relatively to the lever 5, so as to engage at will either one of the arms 7 and 8. In Figs. 1, 2, and 3 the dog is shown as pivoted to the lever 5 at 18, being provided with an arm 19, extending forward from the pivot and having a tooth 20 to engage the notch 12 of the arm 7, and being further provided with an arm 21, extending rearwardly from the pivot and having a tooth 22 to engage the notch 12 of the arm 8. The dog is tilted by any suitable means—as, for instance, by means of a rod 23, pivoted to the dog at 24 and extended upward along the controlling-lever 5 to a hand-lever 25, pivoted to the controlling-lever, so as to lie adjacent to the grip thereof. A spring 26 tends to hold these parts in the position shown. The position of the dog is further controlled by a guideway 27, which in its preferred form consists of a flange or ledge, either side of which may be engaged by a projection 28 on the dog 11. There is formed in the guideway 27, at a suitable point about midway between the ends thereof, an opening 29, through which the projection 28 may pass from one side of the way to the other.

carried by the lever and adapted to engage either arm, means for operating said dog, and a guideway-flange having an opening, the dog being provided with a projection adapted to pass through said opening and to engage either the upper or under side of the guideway-flange, substantially as described.

In testimony whereof I affix my signature in presence of two witnesses.

CLAYTON W. RUSSELL.

Witnesses:
  E. O. HAGAN,
  IRVINE MILLER.